Dec. 13, 1955 R. F. COLLINS 2,726,750
STRAIGHTENING ARM FOR VEHICLE MOUNTED ELEVATORS
Filed Nov. 28, 1952 2 Sheets-Sheet 2
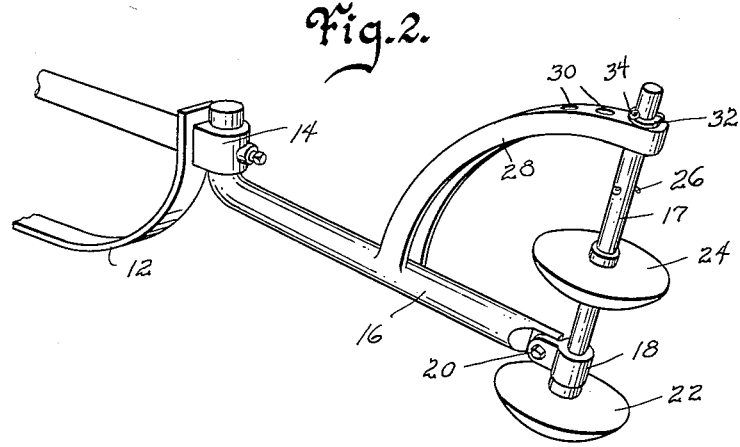
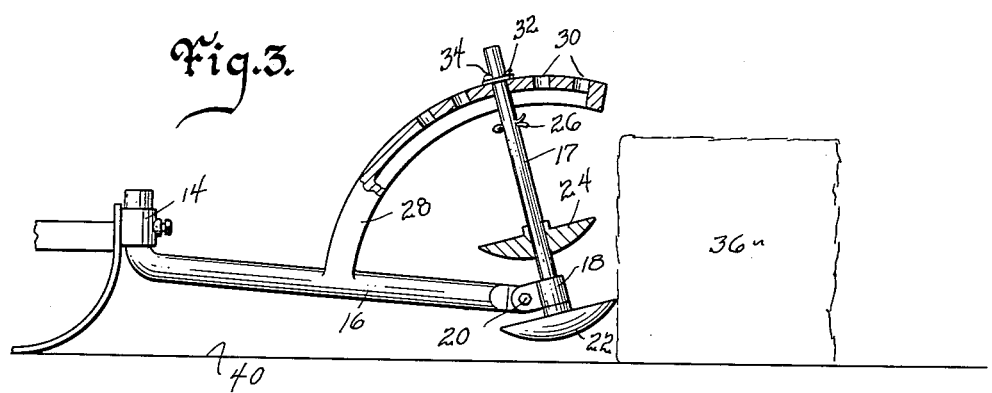
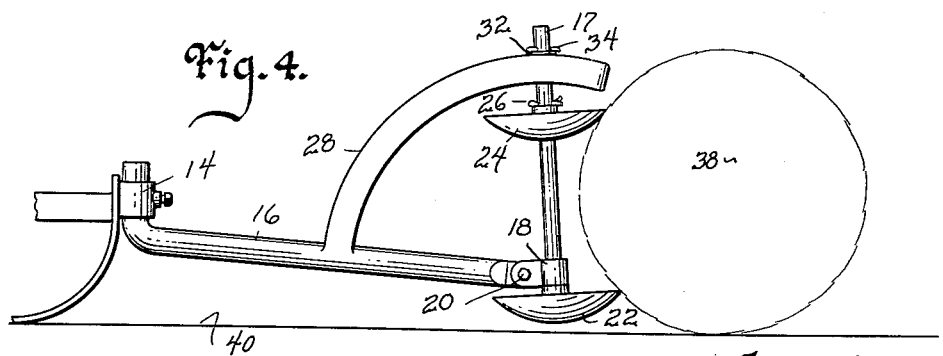

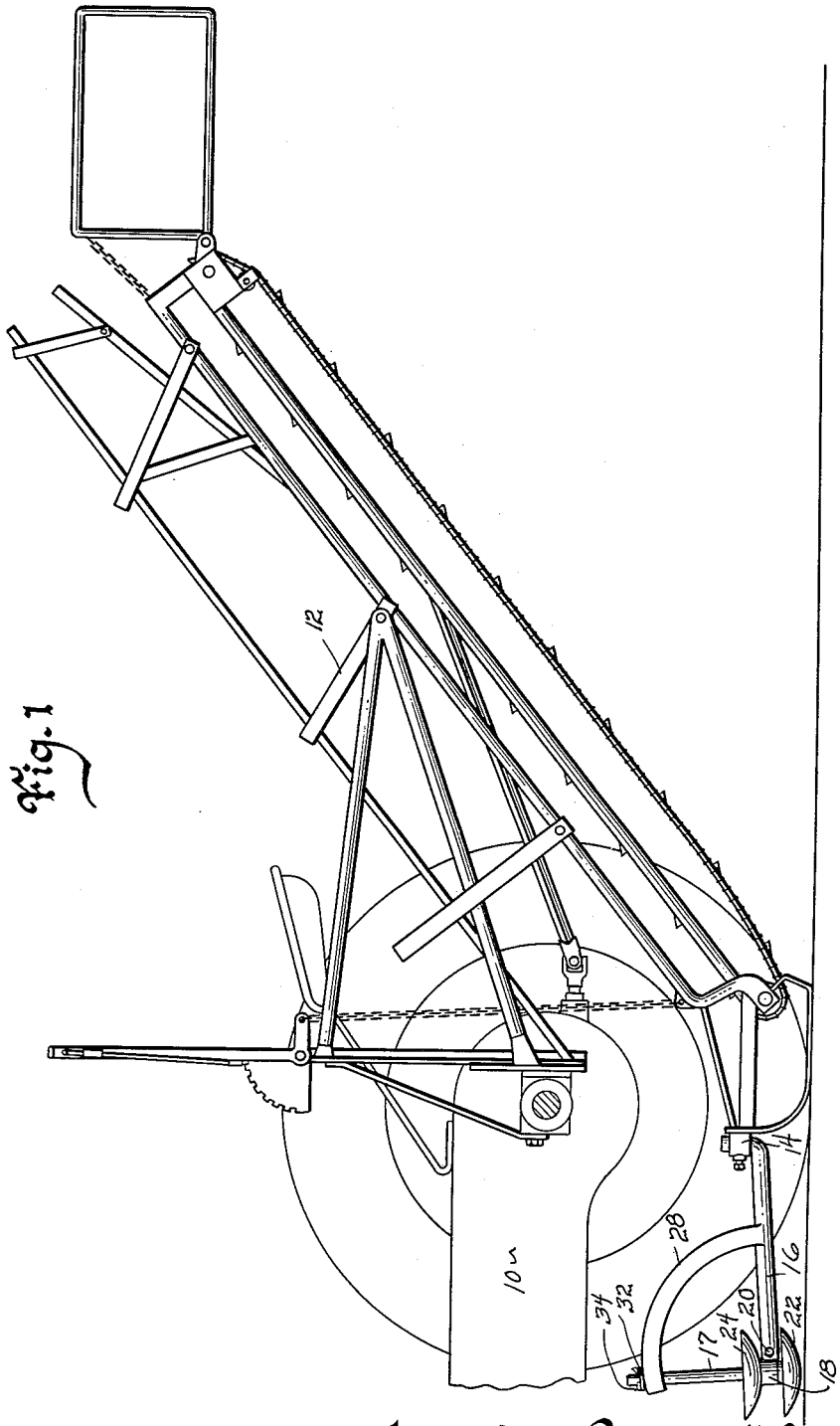

United States Patent Office 2,726,750
Patented Dec. 13, 1955

2,726,750

STRAIGHTENING ARM FOR VEHICLE MOUNTED ELEVATORS

Robert F. Collins, Seymour, Iowa

Application November 28, 1952, Serial No. 323,112

5 Claims. (Cl. 198—7)

My invention relates to vehicle mounted elevating mechanisms and specifically I have invented a straightening arm therefor which requires no ground riding shoe to prevent the arm from digging into the ground.

In the last decade or two it has become more and more common to store hay in the form of bales. The baling machines most commonly used are those which are towed through the field and which bale the hay as they are towed. As a result of the use of mobile baling machines the completed bales are left standing over the hay field. If the bales are to be stored in a central location or collected for sale, it is necessary to proceed around the field with a vehicle of some kind in order to pick them up. As these hay bales are rather large and awkward, considerable manpower is required to gather them unless some form of elevator or pickup is used. Within the last few years, therefore, bale pickups that are mounted on tractors or trucks have become very common. All of these elevating mechanisms, however, have either been equipped with guide arms originally or have been equipped with guide arms after some use of the device demonstrated the need for one.

Guide arms themselves have developed through the years from a rigid arm equipped with a smooth shoe or the like that was intended to slide over the face of a bale to devices having rotary type buffers.

All of these guide or straightening arms have been provided because experience has shown that the bales often fall in irregular positions with reference to any line of travel that might be followed by a vehicle used to collect them. While many bales might assume a position on the field surface that would make an approach to them with an elevator device rather easy there are always at least some which are positioned crosswise to the line of travel most convenient for majority of the bales. If a satisfactory straightening member is provided, the position of the bale relative to the elevating mechanism is of little or no importance. The straightening arm will strike hte bale in a manner causing it to become properly aligned for entry into the elevating mechanism. The exact chronological order in which the straightening arm has evolved is not known to me, but in general it was discovered that the smooth non-rotating buffer had a tendency to slide up over around bales at least. In order to have a universal straightening arm, therefore, the rotary buffers having sharp projections on them were employed. These buffers were found highly satisfactory except for the fact that if they engaged the ground they tended to "dig in." Consequently a ground riding shoe is generally secured to the guiding arm and extending below the bottom of the rotatable buffer unit. This structure provided an entirely satisfactory straightening arm; but one which, in view of my present invention, is relatively expensive.

In view of the foregoing therefore, it is the principal object of my invention to provide a rotary type buffer that requires no ground engaging shoe thereon.

It is a further object of my invention to provide such a straightening arm buffer that will not ride up over round bales.

It is a further object of my invention to provide a buffer on the rotary type that will tend to disengage itself from any ground snagging that may result when it is used on extremely uneven terrain.

It is a further object of my invention to provide a rotary buffer that will handle all types of bales.

It is a still further object of my invention to provide a rotary buffer unit that is inexpensive to manufacture, or rugged construction, and is refined in appearance.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a side elevation view of a vehicle mounted elevating mechanism equipped with my straightening arm and shown secured to a fragment of a vehicle, Fig. 2 is an enlarged perspective view of a fragment of one shoe of the elevating mechanism and my guiding arm, Fig. 3 is an enlarged side elevation view of my straightening arm with portions of the device broken away to illustrate its construction more fully, and Fig. 4 is an enlarged side elevation view of my straightening arm shown engaging a round bale as distinguished from the square bale illustrated in Fig. 3.

Referring to the drawings and specifically Fig. 1, I have used numeral 10 to designate a powered vehicle such as a tractor or the like to which is secured a powered elevating mechanism 12 in this case a baled hay elevator. At the lower forward end of the elevator is some means for securing a straightening or guide arm to the elevator. I have used the fixed collar 14 merely as a single illustrative method. In the collar is mounted an elongated member 16 which is provided at its outer end with some suitable means for rotatably supporting a shaft such as the one 17. I have shown the collar 18 to serve as this support and it is hingedly secured to the outer end of the elongated member by any suitable means such as the nut and bolt assembly 20. Secured to the shaft 17 are a pair of discs, the lower one of which is designated 22 and the upper one 24. At least the upper disc is movable on said shaft 17 and is limited from having excessive vertical movement by any suitable means such as the cotter pin 26. The shaft is also supported by the arc member 28 which is rigidly secured to the elongated member in any suitable manner as by welding or the like. The arc member is provided with a series of bearing holes designated 30. A suitable washer 32 and cotter pin 34 or the like supports the shaft 16 against vertical movement downward relative to the arc member. The square bale in Fig. 3 is designated 36, while the round one in Fig. 4 has been assigned the numeral 38. In each figure the ground surface is designated by the numeral 40.

The operation of my device is largely automatic. An operator of a vehicle carrying or powering an elevating mechanism, such as the units 10 and 12 in Fig. 1, merely guides the unit to cause the straightening arm to strike a misaligned bale at the side and beyond the center line of its length measuring from the end nearer to the elevating mechanism. Continued forward movement of the vehicle pushes the outer end of the bale around and causes the bale to enter the elevator 12 end first.

In some cases, the straightening arm will extend down from its point of attachment to the elevator, the collar 14 in our illustration, in an acute angle as shown in Figs. 1, 3 and 4. On some devices the angle may be even greater and it may be necessary to angle shaft 17 back toward the elevator as shown in Fig. 3. To accomplish this result, the shaft 17 is freed for vertical movement by removing cotter pin 34 and the lowering of the shaft out of the bearing hole in the arc member. Tipping of the shaft is achieved by reinserting it in a different bearing hole by hingedly moving the collar 18 to permit the shaft to become aligned with a different one of the bearing holes 30. The shaft is then resecured by use of the washer and cotter key.

My discs work in substantially the same manner that the rotary spiked buffers operate in the sense that they rotate over the face of the bale. They are distinct from the usual rotary buffer in that they rely on the sharp edge of the discs to engage and grip the face of the bale by embedding themselves slightly therein to prevent the arm from riding up over the bale. The upper disc is free to ride up the bale face and engage a portion of the bale that is above the center line. Because the bottom disc is formed convexly, it may be placed close to the ground. Its convex bottom will serve as a ground engaging sliding shoe to prevent the arm from digging in. Furthermore, this lower disc can be positioned low enough to assure that it will engage a round bale below its center point measuring vertically. On extremely uneven ground, the forward edge of the lower disc may engage a ground swell or the like, but because it is smoothly formed on the edge and rotatably secured to the arm, the disc will walk or rotatably climb to the surface very readily. Obviously no separate ground engaging shoe is necessary when my convexly curved bottom disc is used on the lower end of the shaft 16. It is possible to construct my straightening arm less expensively, therefore, than would be true for any rotating buffer that has a separate gliding shoe secured to the lower side of the arm. Obviously my arm is less expensive to manufacture than the usual rotary buffer unit. Furthermore, my convex bottomed lower disc is a more efficient shoe than is the usual sliding shoe. Clearly I have invented a structure that accomplishes the objects of my invention through coordinated operation of all the various parts.

Some changes may be made in the construction and arrangement of my straightening arm for vehicle mounted elevators without departing from the real spirit and purpose of my invention, and it is my intention to cover by my claims, any modified forms of structure or use of mechanical equivalents which may be reasonably included within their scope.

I claim:

1. In a straightening arm for a vehicle mounted elevating mechanism, an elongated member, an arc member rigidly secured to said elongated member, a collar hingedly secured to said elongated member; said arc member having a plurality of bearing holes therein, a shaft journalled in said collar and a selected one of said arc member bearing holes, and a pair of discs mounted on said shaft.

2. In a straightening arm for a vehicle mounted elevating mechanism, an elongated member, an arc member rigidly secured to said elongated member, a collar hingedly secured to said elongated member; said arc member having a plurality of bearing holes therein, a shaft journalled in said collar and a selected one of said arc member bearing holes, and a pair of discs mounted on said shaft; one of said discs being mounted below said collar and having a convex bottom.

3. In a straightening arm for a vehicle mounted elevating mechanism, an elongated member, an arc member rigidly secured to said elongated member, a collar hingedly secured to said elongated member; said arc member having a plurality of bearing holes therein, a shaft journalled in said collar and a selected one of said arc member bearing holes, a pair of discs secured to said shaft, and a means secured to said shaft at a selected one of predetermined spaced apart points for limiting axial movement of one of said discs in one direction.

4. In a straightening arm for a vehicle mounted elevating mechanism, an elongated member, means on one end of said elongated member for securing it to an elevator mechanism, a shaft hingedly secured to the other end of said elongated member, and a pair of non-cutting, freely revolving discs secured to said shaft; and a means secured to said shaft at a selected one of predetermined apart points for limiting axial movement of one of said discs in one direction; at least the lower one of said pair of discs being attached to the outer projecting end of said shaft and having a convex bottom.

5. In a straightening arm for a vehicle mounted elevating mechanism, an elongated member, an arc member rigidly secured to said elongated member and having a plurality of bearing holes therein, a shaft hingedly secured at the bottom to said elongated member and at the top journaled in one of said arc member bearing holes, a pair of freely revolving discs secured to said shaft, at least the lower one of said discs having a convex bottom and being attached to the outer projecting end of said shaft.

References Cited in the file of this patent

UNITED STATES PATENTS

| | | |
|---|---|---|
| 810,693 | Anthony | Jan. 23, 1906 |
| 1,124,059 | Piper | Jan. 5, 1915 |
| 2,335,924 | Elholm | Dec. 7, 1943 |
| 2,354,274 | Orelind | July 25, 1944 |
| 2,594,221 | Ryan | Apr. 22, 1952 |
| 2,597,220 | Appel | May 20, 1952 |
| 2,606,416 | Bruner | Aug. 12, 1952 |